Oct. 9, 1934.  G. H. CONNORS  1,976,255
FIFTH WHEEL COUPLING MECHANISM FOR VEHICLES
Filed March 3, 1933   3 Sheets-Sheet 1
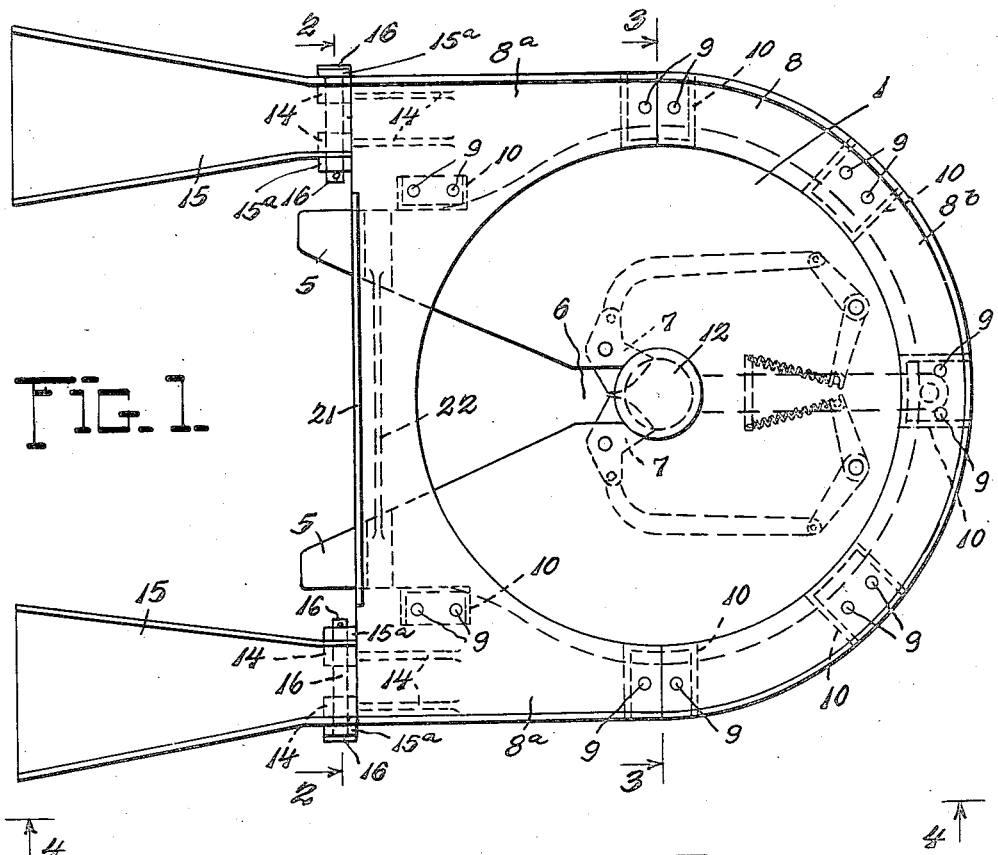
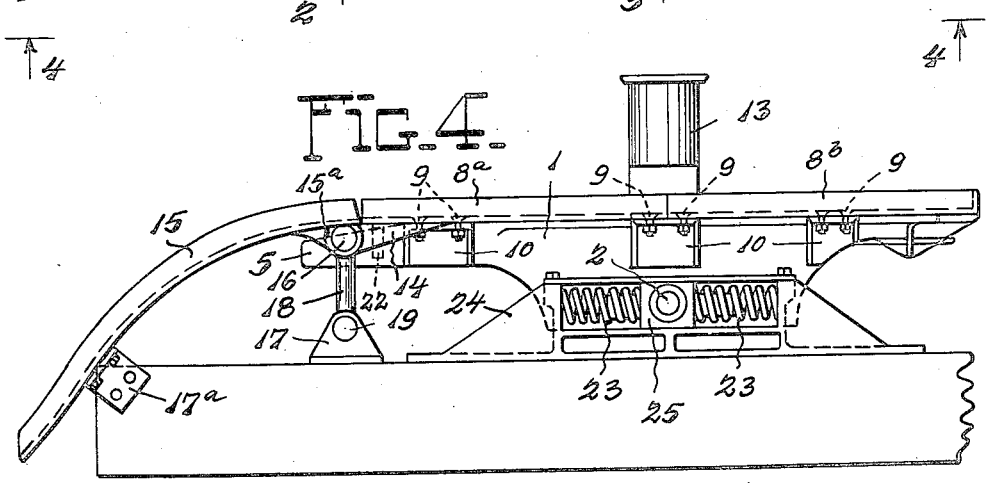
Inventor
GEORGE H. CONNORS.
By Robb–Robb
Attorneys Oct. 9, 1934.　　　G. H. CONNORS　　　1,976,255
FIFTH WHEEL COUPLING MECHANISM FOR VEHICLES
Filed March 3, 1933　　　3 Sheets-Sheet 2
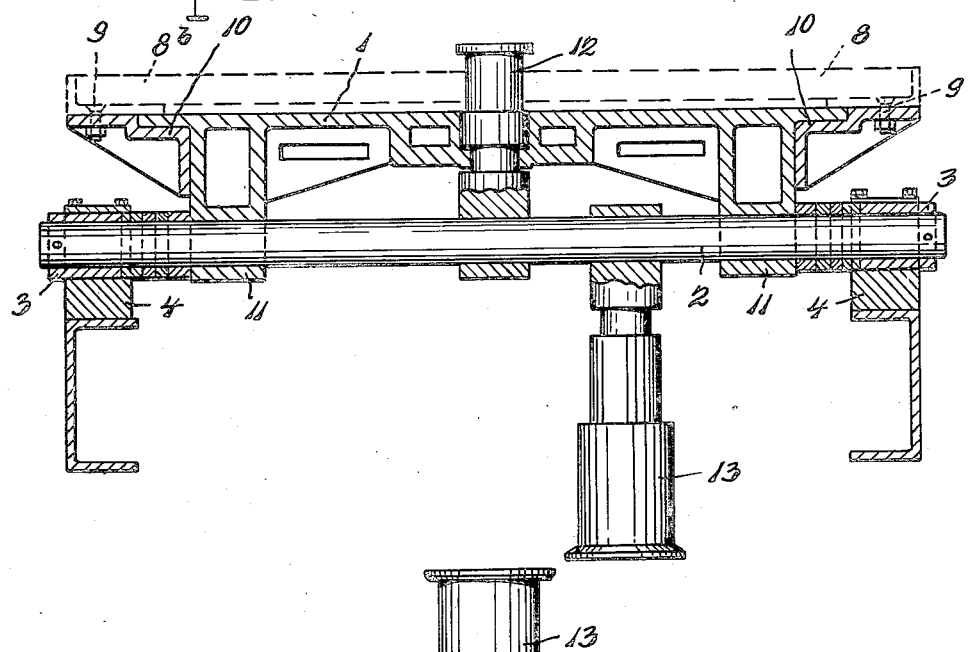
Inventor
GEORGE H. CONNORS.
By Robb & Robb
Attorneys Oct. 9, 1934.    G. H. CONNORS    1,976,255
FIFTH WHEEL COUPLING MECHANISM FOR VEHICLES
Filed March 3, 1933    3 Sheets-Sheet 3
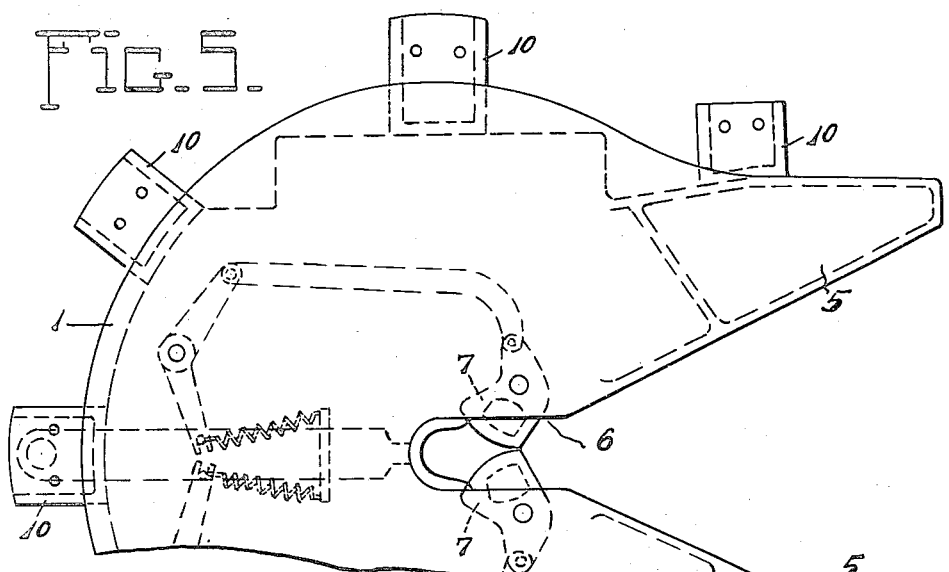
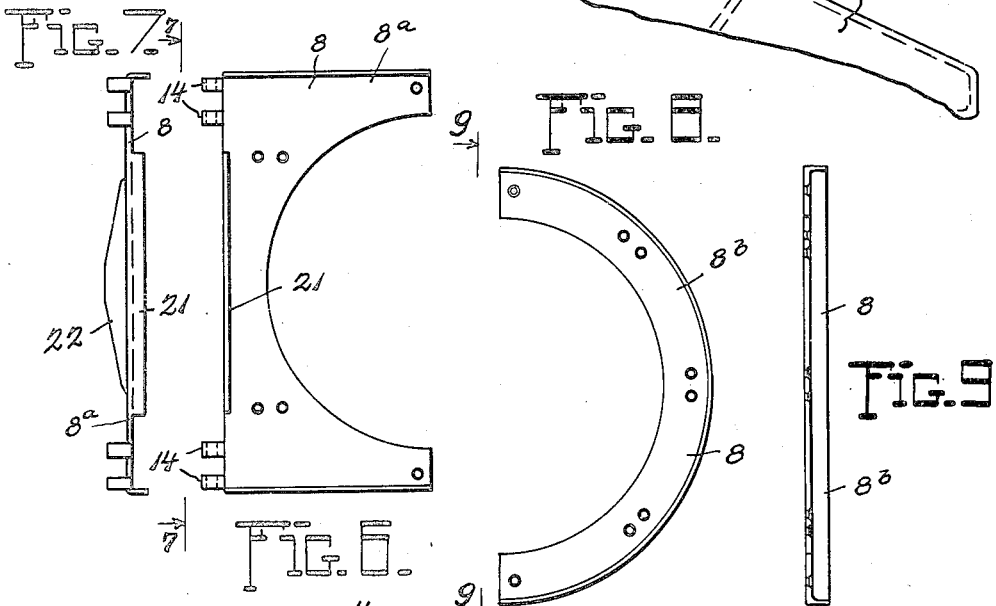

Patented Oct. 9, 1934

1,976,255

UNITED STATES PATENT OFFICE 1,976,255

FIFTH WHEEL COUPLING MECHANISM FOR VEHICLES

George H. Connors, Edgerton, Wis., assignor to Highway Trailer Company, Edgerton, Wis., a corporation Application March 3, 1933, Serial No. 659,581

20 Claims. (Cl. 280—33.1)

In the fifth wheel construction for vehicles represented by the present invention, there is designed a device of this character which is adapted for universal coupling with any given type of trailer vehicle.

As is well known, in the motor vehicle art, especially in connection with vehicles used for commercial transportation of freight and the like, it is common to employ units made up of a tractor vehicle and a trailer vehicle, the tractor and trailer being coupled together by suitable coupling instrumentalities.

These instrumentalities include, in common practice, a so-called lower fifth wheel mounted upon a tractor vehicle which is adapted to engage and interlock with mating coupling devices carried by the trailer vehicle. The interlocking of the lower fifth wheel member with the trailer coupling instrumentalities is customarily carried out through the provision of a king pin device adapted to effect interlocking between the lower fifth wheel member of the tractor and the trailer coupling devices.

Various types of coupling mechanisms are commonly encountered, and it is one object of this invention to render a given tractor fifth wheel member applicable for coupling with any of these types. One of these types employs a fifth wheel coupling member only on the tractor, which is adapted to engage and interlock with a king pin mounted on a fifth wheel member carried by the trailer vehicle, this king pin depending from the trailer and being adapted to interlock with coupling jaws on the tractor fifth wheel for effecting coupling operations between the vehicles.

Another type of construction substitutes for the aforesaid tractor fifth wheel coupling member, an upstanding king pin mounted on the tractor which is adapted to interlock with a fifth wheel member mounted on the trailer.

In a still further type of coupling mechanism, the tractor is provided with guides for receiving supporting rollers mounted on the forward end of the trailer, which rollers are adapted to run along the guides, which serve as tracks, there being a king pin included in the coupling mechanism of the tractor for interlocking with the trailer. Locking members are carried by the trailer and are adapted to grip the upstanding tractor king pin, being brought into operative relation therewith by the cooperation of the rollers and guides.

It has heretofore not been possible to couple together vehicles respectively provided with different types of coupling devices. For example, it is obviously not possible to couple a tractor provided with an upstanding king pin with a trailer provided with such a king pin, since obviously no means is present for providing the required interlocking action between the respective parts.

The present invention provides a tractor fifth wheel construction which is universally applicable to any of the types of trailer coupling mechanism above indicated. The construction of the present improved fifth wheel is very simple in its nature, and does not materially alter the usual construction of the fifth wheel.

Briefly outlined, the present invention embraces the usual tiltable fifth wheel mounted on a tractor which has associated therewith adjustably mounted king pin structures which may be alternatively employed for use in connection with a corresponding type of trailer coupling mechanism, and which king pin structures may be rendered entirely inoperative where it is desired to couple the lower fifth wheel with a trailer which includes a king pin as a part of the trailer coupling instrumentalities.

In the accompanying drawings:—

Figure 1 is a plan view of a fifth wheel provided with the improved instrumentalities of the invention, including the guide tracks referred to above.

Figure 2 is a rear elevation of the fifth wheel, taken on the line 2—2 of Figure 1, looking in direction of the arrows.

Figure 3 is a sectional view taken on the line 3—3 of Figure 1, the guide track being removed, but the position thereof being indicated in dotted lines.

Figure 4 is a side elevation of the fifth wheel of Figure 1, taken on the line 4—4 of Figure 1, looking in the direction of the arrows.

Figure 5 is a fragmentary plan view of the fifth wheel of Figure 1, with the track removed.

Figure 6 is a plan view of the rear track section.

Figure 7 is a rear elevation of the section of Figure 6, taken on the line 7—7 of Figure 6.

Figure 8 is a plan view of the forward section of the track, adapted to mate with the section of Figure 7.

Figure 9 is an end elevation of the section of Figure 8, taken on the line 9—9 of Figure 8.

Figure 10 is a side elevation of guide devices employed to guide supporting rollers associated with a mating coupling member onto the track, as indicated previously in this specification.

Figure 11 is an end view of the guides of Figure 10, taken on the line 11—11 of Figure 10, looking in the direction of the arrows.

Referring more particularly to the drawings, the present improved construction includes a fifth wheel 1 of standard shape and type, tiltably mounted on the pivot shaft 2, which shaft is supported in bearings 3 of brackets 4 mounted on the tractor.

The fifth wheel 1 has the usual guide portions or wings 5, converging into the customary king pin receiving slot 6, which has, cooperating therewith, the usual locking jaws 7 for interlocking with the king pin.

Substantially surrounding the periphery of the fifth wheel 1 is the track 8, which is composed of two mating sections 8a and 8b, the section 8a being the rear section of the track and the section 8b being the forward section; that is adapted to enclose the forward half of the fifth wheel. These sections are secured, preferably removably, through bolts 9, passing through brackets 10. This structure will be discussed more in detail hereinafter.

It has been said that the fifth wheel 1 is tiltably mounted on the shaft 2. This mounting is effected in the customary way through the provisions of trunnions 11 forming bearings through which the shaft 2 is passed. Loosely mounted on the shaft 2 intermediate the trunnions 11, and freely slidable along the shaft 2 are the king pin members 12 and 13 of types such as may be employed to effect satisfactory coupling connections with any of the types of trailer coupling mechanisms previously mentioned. These king pin members are of such configuration as will not interfere with the sides of the slot 6 but which will be engageable by the locking jaws 7 to retain the king pin members in their operative position.

It will therefore be seen that either of the king pin members 12 or 13 may be used as required by the corresponding trailer coupling mechanism, or where the latter mechanism is of the type which includes in itself a king pin, both of the king pin members 12 and 13 may be dropped to inoperative position.

It will be apparent from the drawings that these king pin members 12 and 13 are freely slidable along the shaft 2 in a direction laterally of the fifth wheel 1.

The end sections of the track 8 are provided with lugs 14 for receiving and supporting guides 15, as shown in Figure 4.

It will therefore be seen that the fifth wheel of the present construction is adapted to be used selectively with any of the types of trailer coupling mechanism hereinbefore referred to, thereby rendering a very substantial increase in the range of operativeness of the given fifth wheel member without necessitating any substantial change in the construction of the fifth wheel itself. Of course, the king pin members must be of such relationship as to size as not to be obstructed by the sides of the slot 6 and thereby locked in upright or operative position by the locking jaws 7. The fifth wheel of the present construction is the type of fifth wheel illustrated and described in the Martin and Farr Patent, No. 1,412,025, granted April 4, 1922.

The details of the mounting of the track will now be considered. It will be noted that the track sections overlie the periphery of the fifth wheel member. The lugs 14 on each side of the track section 8a are adapted to register with lugs 15a on the guides 15, so that securing bolts 16 may be passed through these lugs for securing the guides 15 in position.

Since the weight of the front end of the trailer is considerable, the guides 15 must be supported sufficiently rigidly and interconnected with the fifth wheel 1 in such a manner as to prevent tilting of the fifth wheel during coupling operations and to enable the guides 15 to carry the weight of the trailer during coupling. For the bracing of the fifth wheel and guides, the trailer is provided with brackets 17, between each pair of which is mounted the supporting arm 18, turnable on the pin 19, and held in position by the pin 16 passed through the registering lugs 14 and 15a. The pin 16 is removable so that the supporting arm 18 may be released to swing about pins 19 to enable the guides 15 to be detached when not required.

In order for the track to overlie the edge of the fifth wheel member 1, the brackets 10 supporting the track must be of such a shape that their upper surface will be flush with the upper surface of the fifth wheel 1. The brackets 10 therefore lie closely adjacent the periphery of the fifth wheel member 1, and are shaped so as to be closely engaged by the same, being welded or otherwise secured to the fifth wheel.

The section 8a of the track is provided with upwardly and downwardly extending flanges 21 and 22 for reinforcing the track section 8a.

The shape of the guides 15 is such that there is an easy incline from the plane of engagement of the trailer of these guides up to the plane of the track 8. The guides 15 are also connected with the frame of the tractor by means of brackets 17a.

It may be noted from the drawings that in addition to the provision of the track, the fifth wheel 1 may be still further modified in its construction in order to give the desired rigidity during coupling operations by somewhat modifying the mounting of the buffer springs 23, by mounting these springs in a bracket 24 in which is inserted the block 25 so that the springs 23 bear against this block and cushion the block in its longitudinal movement relatively to the bracket. The pivot shaft 2 of the fifth wheel is passed through the block. It is understood of course that this structure is duplicated on both sides of the fifth wheel.

In operation, where the tractor equipped with the present improved fifth wheel construction is to be coupled with a trailer which is provided with forward guide rollers, the track sections are assembled on the fifth wheel as shown in Figure 1, while when the coupling is to be effected with a trailer not provided with such rollers, the track is demounted and only the selected king pin unit is employed. In the event the trailer itself is provided with a king pin, obviously both king pin units 12 and 13 are dropped to inoperative position. The improved structure is therefore applicable to several types of trailer construction.

It will be noted that the portion 22 of the track portion 8a is of sufficient thickness to compensate for the slight angle of the extensions 5 of the fifth wheel.

Having thus described my invention, what I claim as new and desire to secure by Letters Patent of the United States, is—

1. Vehicle coupling mechanism comprising, in combination, a fifth wheel coupling member mounted upon a tractor vehicle, a supporting member carrying the said fifth wheel member, and different types of selectively operable coupling instrumentalities mounted on the supporting member each adapted to be separately moved along the supporting member and to be rotated with respect thereto to alternatively interlock with the fifth wheel member for enabling the said fifth wheel member to be coupled with a given mating coupling member on a trailer vehicle.

2. Vehicle coupling mechanism comprising, in combination, a fifth wheel coupling member mounted upon a tractor vehicle, a supporting member carrying the said fifth wheel member, and separate selectively operable king pin members mounted on the supporting member and movable therealong for alternatively interlocking with the fifth wheel member for enabling the fifth wheel member to be coupled with a given mating coupling member on a trailer vehicle.

3. Vehicle coupling mechanism comprising, in combination, a fifth wheel coupling member mounted upon a tractor vehicle, a supporting member carrying the said fifth wheel member and selectively operable king pin members of different configurations mounted on the supporting member each of said king pin members being movable along said support to a position where each may be interlocked with the fifth wheel member, for enabling the fifth wheel member to be coupled with a given mating coupling member on a trailer vehicle.

4. Vehicle coupling mechanism comprising, in combination, a fifth wheel coupling member mounted upon a tractor vehicle, a supporting member carrying the fifth wheel member, and interchangeable, selectively operable king pin members of different configurations mounted on the supporting member for alternatively interlocking with the fifth wheel member for enabling the fifth wheel member to be coupled with a given mating coupling member on a trailer vehicle, the said king pin members being freely rotatable on the supporting member, and slidable therealong for proper positioning relative to the fifth wheel member for interlocking therewith in operative position.

5. Vehicle coupling mechanism comprising, in combination, a fifth wheel coupling member mounted upon a tractor vehicle, an axle carrying the fifth wheel member, the said fifth wheel member being tiltable on the said axle, interchangeable king pin coupling members mounted on the axle and freely turnable relative thereto and adapted to be alternatively interlocked with the fifth wheel coupling member for adapting the said fifth wheel member to be coupled with a mating coupling member on a second vehicle otherwise unconnectible with the said fifth wheel member, the said king pin coupling members being freely shiftable along the said axle to enable them to be positioned so as to be turned into cooperation with the fifth wheel coupling member.

6. Vehicle coupling mechanism comprising, in combination, a fifth wheel coupling member mounted upon a tractor vehicle, a supporting member tiltably carrying the said fifth wheel member, selectively operable king pin members of different configurations mounted on the supporting member for free rotation and longitudinal movement relative thereof for enabling the king pin members to be alternatively interlocked with the fifth wheel member for enabling the fifth wheel member to be coupled with otherwise unconnectible coupling instrumentalities of a second vehicle, a removable track mounted on the said fifth wheel member for receiving vehicle supporting devices associated with the coupling instrumentalities of the second vehicle, and means on the track for attaching guide members to the track for guiding the said devices thereon, the said means securing the guides in proper guiding position relative to the track.

7. Vehicle coupling mechanism comprising, in combination, a fifth wheel coupling member mounted upon a tractor vehicle having a frame, a support member mounted on the tractor vehicle frame, separate interchangeable supplemental coupling instrumentalities mounted on said support member and shiftable longitudinally thereof adjacent the fifth wheel coupling member for alternatively interlocking therewith for adapting the fifth wheel member to be coupled with a mating coupling member on a second vehicle otherwise uncoupleable with the said fifth wheel member, all of the said supplemental coupling instrumentalities being positionable in inoperative position to enable an unobstructed fifth wheel coupling surface to be presented to the said mating coupling member if so desired.

8. Vehicle coupling mechanism comprising, in combination, a fifth wheel coupling member adapted to be mounted upon a tractor vehicle, an axle member tiltably carrying the fifth wheel member, separate interchangeable supplemental coupling instrumentalities mounted on the axle member for free rotation and free longitudinal movement relative thereto, and a track mounted around the periphery of the said fifth wheel member for receiving vehicle supporting devices associated with the said mating coupling instrumentalities.

9. Vehicle coupling mechanism comprising, in combination, a fifth wheel coupling member mounted upon a tractor vehicle, a cooperating coupling device mounted adjacent the fifth wheel member for movement into operative and inoperative positions relative thereto, and for interlocking therewith when in operative position, and a track mounted on the fifth wheel member and extending therearound for receiving vehicle supporting instrumentalities associated with coupling instrumentalities of the second vehicle, the said track overlying the periphery of the fifth wheel member and being provided with means enabling the said track to be demounted when not in service.

10. Vehicle coupling mechanism comprising, in combination, a fifth wheel coupling member mounted upon the tractor vehicle, a track mounted on the fifth wheel member for receiving parts of a second vehicle, a cooperating coupling device mounted adjacent the fifth wheel member for movement into operative and inoperative positions relative thereto and for interlocking therewith when in operative position, guide members removably secured to the track for guiding thereon a mating coupling member to interlock with the said cooperating coupling device, and reinforcing instrumentalities for rigidly mounting the guide members and fifth wheel during coupling operations.

11. Vehicle coupling mechanism comprising, in combination, a fifth wheel coupling member mounted upon a tractor vehicle and a removable track structure mounted on the fifth wheel member, the said structure comprising a track, guide members adapted to be engaged by and to guide a mating coupling member on to the said fifth wheel member, means rigidly interconnecting the guides and track to prevent relative movement therebetween during coupling operations, the said means including interlocking lugs rigidly mounted on the guides of the track, means for interlocking the said lugs together, and bracing instrumentalities mounted on the tractor for interlocking with the said lugs, and means interlocking the said lugs, for rigidly holding the said guides and track relatively immovable.

12. Vehicle coupling mechanism comprising, in combination, a fifth wheel coupling member mounted upon a tractor vehicle, cooperating mating sections adapted to be mounted on the fifth wheel coupling member and to cooperate to form a continuous track overlying the periphery of the coupling member, supporting brackets for the track sections secured to the fifth wheel coupling member and engaging the surface thereof to lie flush against the said surface, the guide members adapted to be interconnected with the track for guiding thereon a mating coupling member for the said fifth wheel coupling member, and instrumentalities for rigidly mounting the said guide members and track relative to each other.

13. Vehicle coupling mechanism comprising, in combination, a fifth wheel coupling member mounted upon a tractor vehicle, a pivot shaft carrying the fifth wheel member, and selectively operable coupling instrumentalities mounted on the pivot shaft and normally housed beneath the fifth wheel member when in inoperative position, the said selectively operable coupling instrumentalities being shiftable relative to the said fifth wheel member to properly align them relative thereto for movement to operative position for adapting the said fifth wheel member to be coupled with different types of coupling instrumentalities carried by a trailer vehicle.

14. A vehicle coupling mechanism which includes, in combination, a fifth wheel coupling member mounted on a tractor vehicle, a supporting member mounted on said vehicle and carrying the fifth wheel member, a plurality of king pin members mounted on said supporting member and adapted to alternatively interlock the said fifth wheel member for enabling the fifth wheel member to be coupled with a mating coupling member on a trailer vehicle, said king pin members each being rotatable on the supporting member and slidable therealong for proper positioning relative to the tractor fifth wheel member, and means mounted on said tractor fifth wheel member for receiving vehicle supporting instrumentalities associated with the trailer, for guiding the mating coupling member of the trailer into cooperation with the selected king pin member on the tractor.

15. A vehicle coupling mechanism which includes, in combination, a fifth wheel coupling member mounted on a tractor vehicle, a supporting member mounted on said vehicle and carrying the fifth wheel member, a plurality of king pin members mounted on said supporting member and adapted to alternatively interlock the said fifth wheel member for enabling the fifth wheel member to be coupled with a mating coupling member on a trailer vehicle, said king pin members each being rotatable on the supporting member and slidable therealong for proper positioning relative to the tractor fifth wheel member, and a track mounted on the said tractor fifth wheel member and extending substantially therearound for receiving vehicle supporting instrumentalities associated with the coupling instrumentalities of the trailer for cooperation with the track to guide the coupling instrumentalities of the trailer to cooperative relation with the selected king pin member on the tractor.

16. In combination with a vehicle having a fifth wheel coupling member having a slot and a locking mechanism including parts projecting into said slot, a support for said fifth wheel member, a coupling instrumentality mounted on said support, said instrumentality being rotatable on the support and slidable therealong, whereby said instrumentality may be moved to the zone of the slot and rotated into engagement with the locking mechanism and subsequently, upon disengagement of the said locking mechanism, moved out of the slot and shifted to one side to clear the zone of the slot, and a second coupling instrumentality mounted on said support and movable into engagement with the locking mechanism when the first named coupling instrumentality is shifted to clear the zone of the slot.

17. In combination with a vehicle having a fifth wheel coupling part having a slot and a locking mechanism associated with the slot, a support for the said fifth wheel, a plurality of coupling instrumentalities mounted on said support, each coupling instrumentality being independently rotatable on said support and movable therealong, whereby each instrumentality may be shifted independently of the other to the zone of the slot and rotated into engagement with the locking mechanism whilst the other hangs free below the fifth wheel member.

18. In combination with a vehicle having a fifth wheel coupling part provided with a locking mechanism, a plurality of king pin members, a support for said king pin members, each king pin being independently mounted on said support and movable therealong, said support bearing such a relation to the fifth wheel that either king pin member may be shifted separately therealong and rotated into engagement with the locking mechanism whilst the other hangs free below the fifth wheel.

19. In combination with a fifth wheel coupling mechanism having a locking mechanism, a plurality of coupling instrumentalities for cooperation with said coupling mechanism, means for suspending said coupling instrumentalities below said fifth wheel, said coupling instrumentalities being independently movable on said support to shift from one side to the other of the locking mechanism and to be aligned with and rotated into engagement therewith.

20. In combination with a fifth wheel coupling device having a locking mechanism, means for supporting a coupling instrumentality below said fifth wheel coupling mechanism, a coupling mechanism mounted on said means and shiftable therealong toward and away from the coupling mechanism and rotatable into engagement therewith.

GEORGE H. CONNORS.